W. M. WHITE.
WATER WHEEL SPEED INCREASER.
APPLICATION FILED AUG. 20, 1913. RENEWED JAN. 25, 1917.

1,223,842.

Patented Apr. 24, 1917.
3 SHEETS—SHEET 2.

Witnesses:
H. R. Barrett
Chas T. Mooney

Inventor:
William M. White
By Smithsonian, Gilb &
Bulley Attys

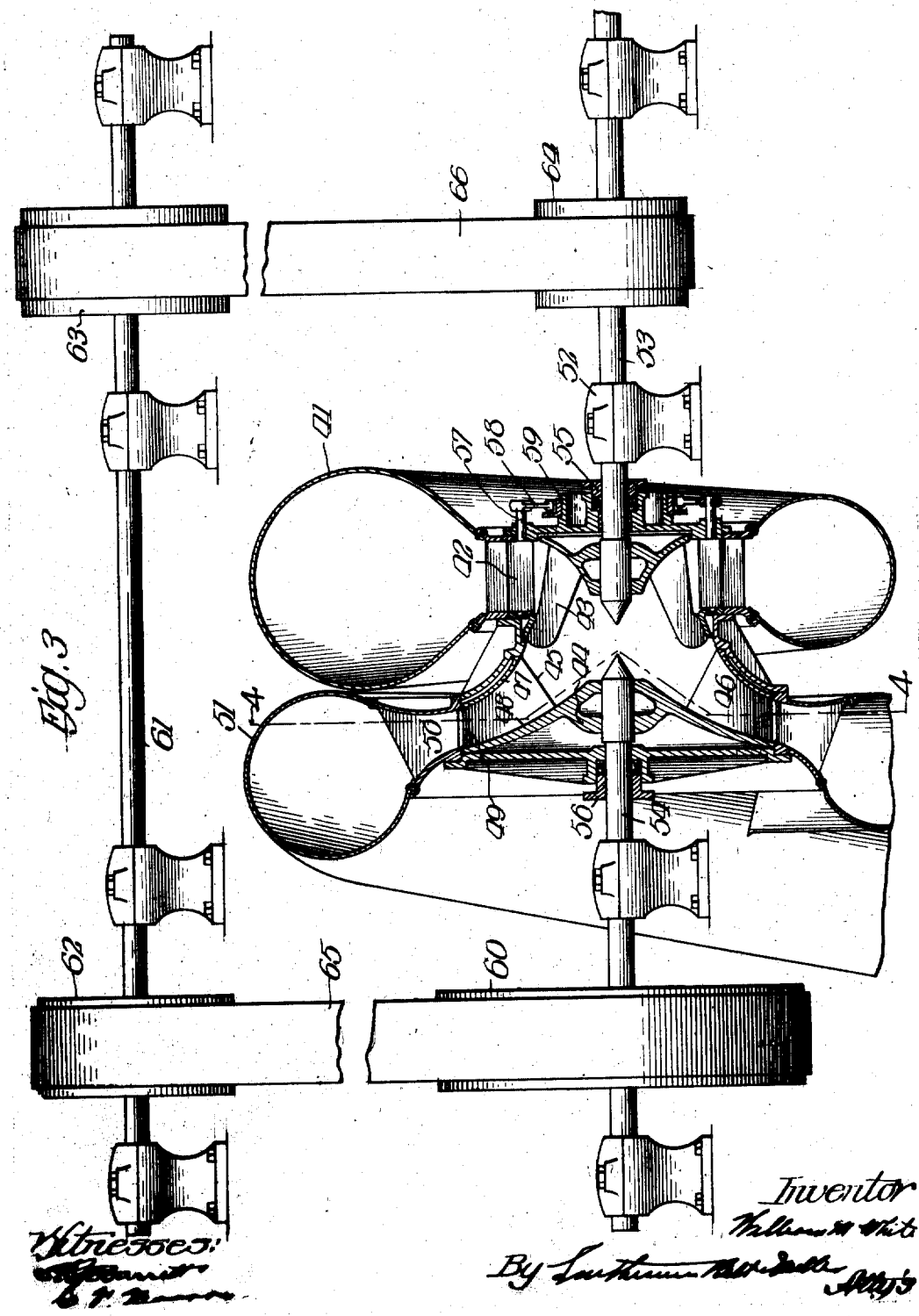

UNITED STATES PATENT OFFICE.

WILLIAM M. WHITE, OF MILWAUKEE, WISCONSIN.

WATER-WHEEL-SPEED INCREASER.

1,223,842.  Specification of Letters Patent.  Patented Apr. 24, 1917.

Application filed August 20, 1913, Serial No. 785,657. Renewed January 25, 1917. Serial No. 144,548.

*To all whom it may concern:*

Be it known that I, WILLIAM M. WHITE, a citizen of the United States, and resident of Milwaukee, in the county of Milwaukee and State of Wisconsin, have invented certain new and useful Improvements in Water-Wheel-Speed Increasers, of which the following is a specification.

My invention relates to speed increasers for installation in water power plants. The device consists of a revolving element located at the discharge of a water wheel runner through which the water from the runner is discharged.

Somewhat similar apparatus is disclosed in my co-pending applications Serial Nos. 769,790 and 769,791, filed May 26, 1913; 774,527, filed June 19, 1913; 797,952, filed Oct. 29, 1913 and 808,161, filed Dec. 22, 1913. These applications disclose and claim apparatus in which fixed passages are located at the discharge of a water wheel for regaining energy in the form of velocity. In my co-pending application 774,528, I have disclosed and claimed a method of carrying out the steps necessary to regain this power.

In the cases above referred to and in the present case this regaining action is accomplished in accordance with Bernouilli's law which is stated on page 76 of "*Treatise on Hydraulics*" by Merriman, edition of 1903, as follows:—

"At any section of a tube or pipe, under steady flow without friction, the pressure head plus the velocity head is equal to the hydrostatic head that obtains when there is no flow."

As recited above, the velocity of flow from the runner is necessarily made great for the reasons given. The velocity head plus the pressure head at the runner would be equal to the velocity head plus the pressure head in the tail race at the same level neglecting friction and eddy losses. The velocity head at discharge of the runner is sometimes made a large percentage of the total head acting on the plant, say, for example, 20%. The draft tube is usually of increasing capacity with the object of decreasing the velocity so that the velocity and consequently the kinetic energy will be low in the tail race. For example, this velocity head of the water in the tail race is usually as low as 3%. Now according to Bernouilli and in accordance with confirming experiments made by me, and neglecting friction, the pressure head plus the 20% velocity head at the runner would be equal to the pressure head plus the 3% velocity head in the tail race or, in other words, in this case the pressure head (or equivalent free water surface) at the runner would be 17% of the total head less than (or lower than) the pressure head (or surface of) the tail water at the end of the draft tube. For example, should the head on a water power plant be twenty feet from the surface of the water above the plant to the surface of the water in the tail race, then, neglecting friction, and in accordance with the above example the equivalent surface of the water at the runner would be 3 and $\frac{4}{10}$ths feet below the surface of the tail water. In other words, the effective head on the water wheel producing flow through it would be 23 and $\frac{4}{10}$ths feet.

In the usual power plant the water wheel is fitted with a draft tube or pipe which receives the water discharged from the runner and conveys it to the tail race. When the water wheel is allowed to run at a greater speed than that for best efficiency for the given head, there is an excess energy in the water discharged from the water wheel which goes to waste in the form of eddies and whirls in the draft tube. This will be more readily understood when one considers the construction and operation of a water wheel runner.

The runner is fitted with numerous vanes or blades shaped to form easy water passages between them. Water is guided into the runner toward the center with a rotary motion by means of guide vanes which are usually pivoted and adjustable. The runner vanes are constructed to receive the water from the guide vanes with least disturbance and to change the direction of the water as it flows through the runner so that the water is discharged from the runner in a direction opposite to that of the rotation of the runner.

The water passages formed by the guide vanes and the runner vanes are so related that for given conditions of power, speed, and head, at maximum efficiency the water is discharged from the runner practically straight out axially from the runner, that is, without rotary motion. Under this condition least energy is allowed to escape from the runner and greatest efficiency developed. When, however, the speed of the runner is increased under the given conditions of power and head, the water leaves the runner with a rotary or spiral motion which contains considerable energy. Thus, by increasing the speed of a water wheel over that which it would be for maximum efficiency, its efficiency and power is rapidly decreased.

In my co-pending applications I have provided stationary passages located at the discharge of the water wheel runner for regaining the above escaping energy. I now provide for the regaining of this energy a revolving impeller fitted with vanes forming passages for discharging the water from the runner. The impeller revolves in the same direction as the water wheel runner, and thus the passages in the impeller formed to receive the water from the runner are moving in the same direction as the runner itself, and this permits of operating the water wheel runner with a greater whirling or rotary motion of the water flowing from it.

The speed of the water wheel for a given power is dependent upon the head of water acting on it. Technically the speed of a given water wheel varies as the square root of the head, I now increase the effective head acting on the runner by means of the revolving impeller, which receives and utilizes water in whirling motion from the runner. Thus by increase of head by means of the utilization of the energy of the water discharged from the runner in a rotary motion, I am enabled to increase the speed of the wheel. The power is also greatly increased by the increase of head on the runner. Technically the power of a given water wheel varies as the three-halves power of the head. By inducing a greater head I am enabled to reduce the size of the wheel for a given power. But the speed of a water wheel varies inversely as its size, and thus by increasing the head by providing means for utilizing whirling water from the runner and reducing the size of the wheel, I am enabled to greatly increase the speed of the water wheel for a given power.

I use the energy in the whirling water discharged from the runner for driving the impeller, and on account of the disposition of the vanes in the impeller it acts similar to the impeller of a centrifugal pump and discharges the water flowing through it against a greater head than exists at the discharge of the water wheel. I thus, in effect, lower the level of the water at the discharge of the water wheel below the level of the water in the tail race, and increase the effective head acting on the water wheel a.

An explanation of the action within the revolving impeller by which this result is accomplished is as follows: Given an operating head from head water to tail water of twenty feet, suppose the water wheel runner to be revolving with such speed as to discharge the water from it at such velocity that the kinetic energy in the water is equivalent to one-half the fall, that is, ten feet. The vanes of the revolving impeller are so shaped as to intercept the water discharged at high velocity from the water wheel runner and direct the same into the impeller with least loss. The vanes of the impeller are shaped at the outlet so that the water is discharged backward relative to the impeller with such velocity relative to the impeller that the outward velocity (relative to the stationary turbine parts) is so small that the kinetic energy of the water at this velocity is only a small portion of the total head of twenty feet. In other words, it is feasible to shape the vanes of the impeller so that the force consumed within the impeller in this example is nearly one-half of the fall of twenty feet. By selecting the proper radial depth of the impeller and the proper curvature of the vanes of the runner the centrifugal force of the water between the vanes may be a considerable portion of the total fall (of twenty feet in the above example), and this centrifugal force is the difference in pressure between the eye of the impeller and the periphery of the impeller. As stated above, the impeller in this example consumes nearly one-half of the energy of the fall and this energy is consumed first, in discharging the quantity of water flowing through the runner against the difference in head between the eye of the impeller and the periphery of the impeller, and second, in friction loss within the impeller. The eye of the impeller is usually considered that portion of the impeller immediately below the runner as shown in the drawings and inside the inner ends of the impeller vanes. As the pressure at the periphery of the impeller is substantially the same as that of the tail race it follows that the difference in pressure between the head water and the eye of the impeller (or discharge of the runner) is greater than the available fall of twenty feet in the above example. It should be understood that the turbine is not developing increased power in proportion to the increase of head acting on it as a large portion of the energy of the fall is discharged from the runner in the form of velocity. The total power plant efficiency will be less by the use of the impeller as described but for this reduction in total plant efficiency there is obtained a greater speed and in some cases a greater power than there would be without it. It is by the above action that I maintain a greater effective head on the water wheel than the available fall. By effective head I mean the head causing flow through the runner. By reason of the greater effective head a greater quantity of water is caused to flow through the water wheel. The losses by friction (water and mechanical) in the impeller plus the additional losses in the water wheel caused by the higher speed is a measure of the decrease in over-all power plant efficiency. The difficulty of changing velocity head into pressure head with high efficiency by causing the high velocity water to flow along a passage of gradually increasing capacity is well known and is noted in most works on hydraulics. On the other hand pressure head may be changed into velocity by means of passages converging in the direction of flow with only negligible losses. In the case of the revolving impeller I am decreasing the absolute velocity of the water by means of converging passages between the outer ends of the impeller vanes and consequently I am enabled to retard the absolute velocity of the water by means of the impeller with resulting high efficiency.

I may decrease the absolute velocity of the water only partially in the impeller and discharge the water from the impeller with considerable velocity into stationary expanding passages for the purpose of regaining the remaining energy due to the velocity of the water which has not been absorbed in the impeller. By this combination I avoid too high velocity of water along the impeller vanes since I do not have to discharge the water from the impeller with sufficiently high velocity to bring the water substantially to rest with relation to stationary parts of the turbine.

By connecting the shaft of the impeller to a power absorbing apparatus and retarding the speed of the impeller I reduce the centrifugal force from the eye of the impeller to the level of the tail water from what it would be if the impeller were running free and also reduce the backward velocity previously referred to, due to the diminishing of the speed of the impeller under load, and in consequence do not absorb all of the available energy which has been discharged from the water wheel in discharging that water because of a smaller difference of elevation between the runner and the tail race than that recited in the above example. In other words, by this means I am enabled to use part of the energy flowing from the water wheel in the impeller to discharge the water against the higher level and the remaining part of the energy in the water to produce power on the power absorbing apparatus as described.

By connecting the shaft of the impeller to a power producing apparatus and revolving the impeller at a greater speed than that speed which it would attain under the first cited condition, I may produce an additional centrifugal force and consequently maintain a greater pressure between the discharge from the water wheel and the tail race.

In order that no energy may be wasted and the greatest speed of the water wheel be maintained, I locate at the discharge from the impeller a passage or passages of increasing capacity in the direction of flow to receive the water from the impeller and transform the energy in it from velocity into pressure. These passages may readily be formed of two surfaces with space between of increasing volume from the impeller outward. Vanes may also be disposed between two surfaces forming a plurality of passages, these passages increasing in capacity from the runner outward.

In the above description I have provided that the impeller be driven by the water from the water wheel. But I do not limit myself to this method of driving. The shaft of the impeller may be extended and driven by an independent source of power. Conversely power may be delivered by the impeller by utilizing in whole or in part the energy permitted to escape from the water wheel.

The speed of the impeller may be influenced by varying the curvature of the vanes forming the passages through the runner. The total energy of the water may be divided between the water wheel runner and the impeller, and power delivered by the water wheel runner at one speed and power delivered by the impeller at another speed. The impeller may be geared or belted to the water wheel shaft whereby a fixed ratio of speed may be maintained between the two and power delivered or absorbed by the impeller or runner shaft.

The preferred arrangement is to locate the impeller adjacent to the water wheel runner, but I do not confine myself to this location as it could readily be placed at some distance from the runner and still serve the purpose of increasing the speed of the water wheel.

The invention will be more readily understood by reference to the accompanying drawings, wherein, Figure 1 is a transverse vertical section of a typical power station showing the application of one form of the revolving impeller;

Fig. 3 is a transverse vertical section of a typical power station showing the application of another form of the revolving impeller with shafts of water wheel and impeller placed in horizontal position, and, Fig. 4 is a horizontal section showing the impeller guide vanes in section along the line 4—4 of Fig. 3.

Figure 1:
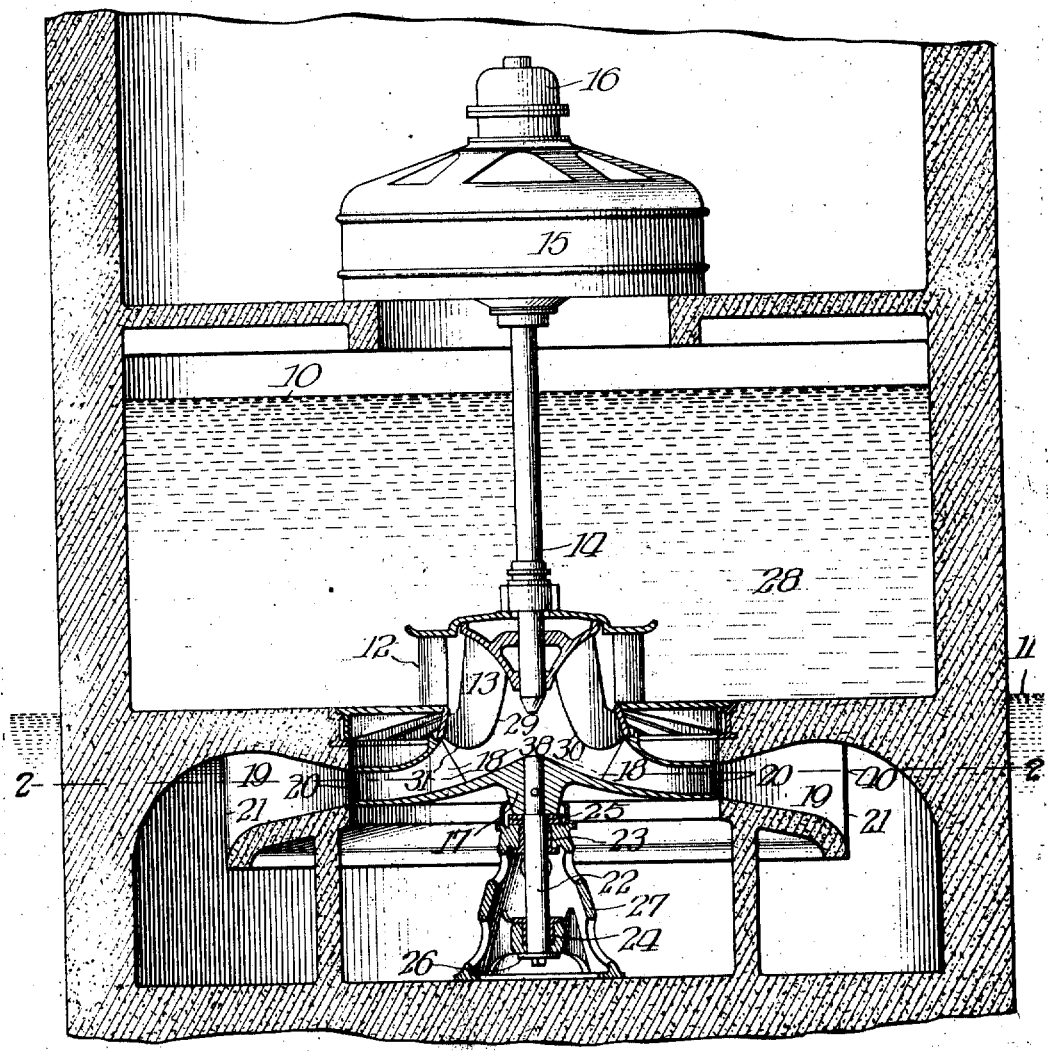
Figure 2:
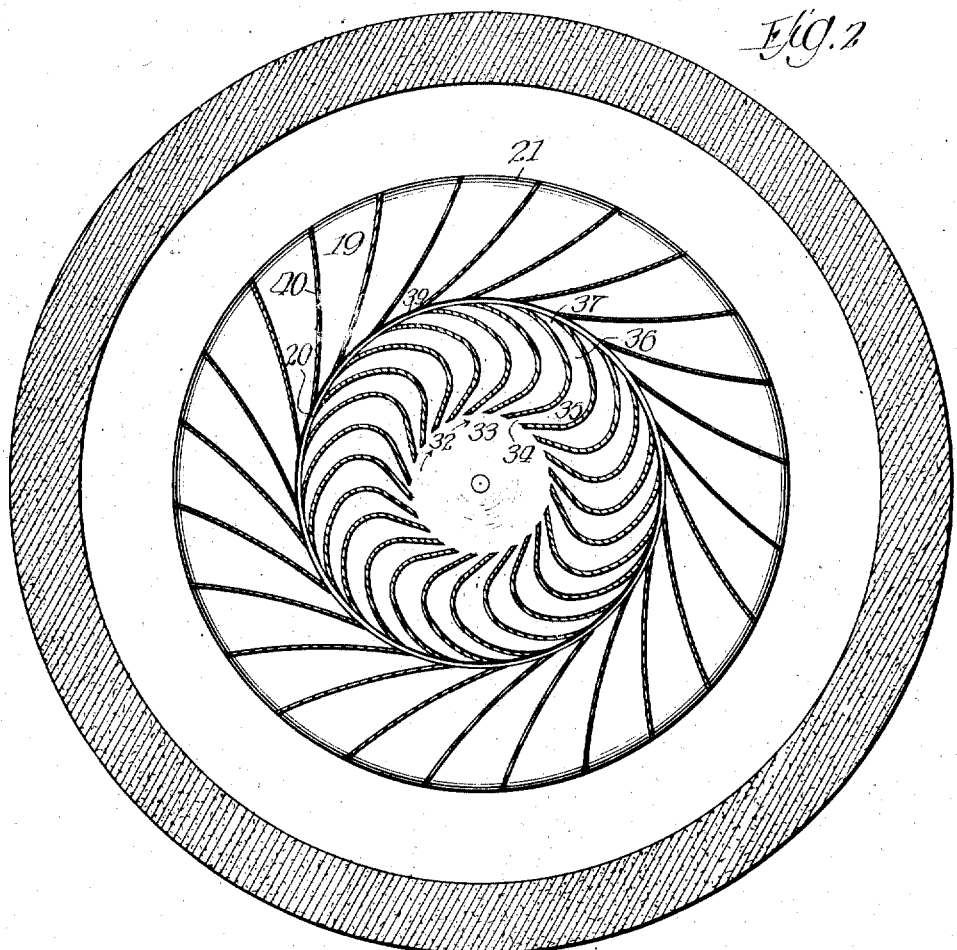
Fig. 2 is a horizontal section on the line 2—2 of Fig. 1, showing the impeller vanes in section.

By reference more particularly to Fig. 1, the level of the head water is indicated at 10, the surface of the tail race at 11. The movable guide vanes or adjustable gates 12, admit water to the water wheel runner 13, secured to shaft 14, which drives the electric generator 15, the weight of the revolving parts being supported by a thrust bearing 16. The revolving impeller 17 is located at the discharge of the water wheel runner; vanes 18 are constructed in the impeller 17; a passage 19, is formed at the discharge of the impeller in this instance of two concrete surfaces, the area of the passage expanding from the impeller tip at 20, outward to the discharge at 21. The shaft 22 of the impeller 17 is supported in an upper guide bearing 23, and lower guide bearing 24. The impeller is held in position vertically by means of an upper thrust bearing 25, and a lower thrust bearing 26. The guide bearings and thrust bearings are supported in a frame casting 27. The water over the wheel chamber at 28 is directed through the guide vanes 12 toward the center of the runner 13 with a rotary motion. The runner 13 is allowed to run at greater speed than that at which it would run in the usual case for maximum efficiency at the given power and head. The water leaving the runner vanes at 29, 30, 31, has a rotary motion in the direction of the rotation of the runner, and contains considerable energy. These will be more readily understood by referring to arrows 32 and 33 in Fig. 2. The water from the runner enters the impeller between the vanes 18 at 34, and on account of its velocity drives the impeller. The water being confined between the vane 18 is given rotary motion as it flows from 34 to 35 to 36 to 37. The guide vanes in the impeller are directed backward opposite to the rotation of the impeller as shown at 37, Fig. 2, and as water flows from the impeller its reaction is such as to also cause the impeller to revolve. The rotary or spiral motion of the water in passing from 34 to 35 to 36 to 37 is such that the centrifugal force produces a difference of pressure between the space below the runner at 38 and the space just beyond the impeller at 39, this action in effect decreasing the level of the water in the chamber 38 below the level of the water in the tail race 11. The water is discharged from the impeller with some tangential motion and the velocity of the water is decreased in flowing through the chamber 19 and its energy changed from velocity at 20 to pressure at 21, whereby a greater head is made available for the increase of speed of the wheel. For certain conditions of power and speed I locate guide vanes 40, in the passage disposed at the discharge of the impeller.

By reference to Fig. 3 it will be noted that connections are shown for the inter-exchange of power. The pulley 60 is located on the shaft of the impeller by which power may be delivered from the impeller 44. An intermediate shaft 61 is fitted with pulleys 62 and 63. A pulley 64 is located on the water wheel shaft. A belt 65 connects pulleys 60 and 62, and a belt 66 connects pulleys 63 and 64 whereby the impeller may deliver power through the belts as shown to the water wheel shaft and from the water wheel shaft to the generator, and by the same arrangement of belts and pulleys power may be taken from the water wheel runner shaft and utilized for driving the impeller.

In Fig. 3 I have shown an arrangement of a horizontal water wheel equipped with the revolving impeller. In this arrangement a circular section plate steel spiral casing 41, is fitted about the guide vanes 42 of the turbine. Water flows through the pipe 41 to the guide vanes 42 into the runner 43, and into the revolving impeller 44, at 45. The impeller 44 is fitted with guide vanes 46, located between the crowns 47, 48, forming curved passages. The velocity of the water drives the impeller which gives a rotary motion to the water within the passages. This rotary motion produces centrifugal force which drives the water out of the impeller at 49, against a greater pressure than exists at the discharge of the water wheel runner. The water discharged from the impeller has considerable velocity and passes between the vanes 50, located outside the impeller. The vanes 50 form passages of expanding area in which the energy of the water is changed from velocity into pressure. The water flows at low velocity through the plate steel spiral casing 51, through a draft pipe into the tail race.

Bearings 52, are provided to support the shaft 53 and runner 43. Bearings are also provided to support the shaft 54 and impeller 44. Stuffing boxes 55, 56, are located in the casing heads of the water wheel and impeller.

In this arrangement each guide vane 42 has an extended shaft 57, to which is fitted a lever 58, the levers of all the guide vanes being operated by a shifting ring 59, by means of which the water to the runner is controlled. This arrangement is suitable for driving a high speed horizontal generator.

Figure 4:
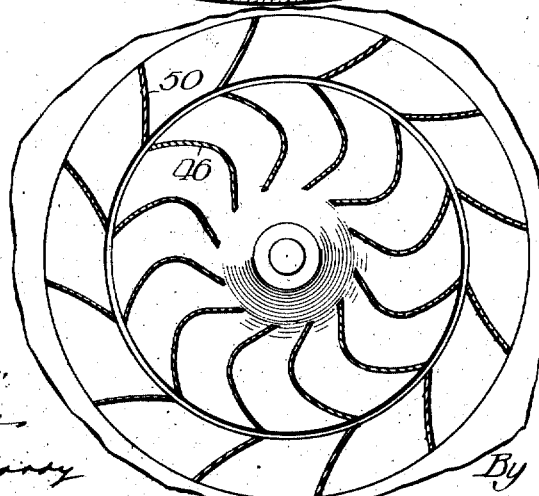

Fig. 4 is a cross section through the vanes of the impeller and through the vanes forming passages for regaining the energy from the impeller. The guide vanes 46 of the impeller are of curved section; the stationary guide vanes 50 form a plurality of passages of increasing area from the impeller outward.

By water wheel under the present specification and claims, I mean a water wheel, hydraulic turbine or any hydraulic power producing apparatus having a runner of such form as to cause the water to be discharged from it preferably axially to the rotation of the runner, and I mean especially any hydraulic power apparatus which may be used with my invention for the accomplishment of the results claimed. One type of a water wheel in the meaning of the specification and claims is illustrated in the drawings.

I claim:

1. The combination of a water wheel and a revoluble impeller mounted for rotation in the same direction as said water wheel fitted with vanes forming passages to receive the water from the water wheel runner, the impeller being driven by such water, the vanes of said impeller extending outwardly from the center and maintaining a rotary motion in the water in the impeller creating centrifugal force to increase the effective head acting on the water wheel, substantially as described.

2. The combination of a water wheel and a revoluble impeller receiving the discharge water from the water wheel runner, the impeller being driven by such water in the same direction as said water wheel runner, the rotary motion of the impeller discharging the water by means of centrifugal force against a greater pressure than exists at the discharge of the water wheel runner, substantially as described.

3. The combination with a water wheel of a revoluble impeller fitted with vanes forming passages through which the water from the water wheel is adapted to be discharged, and stationary vanes located at the discharge of said impeller forming passages of increasing capacity whereby the energy of the water delivered from said impeller is transformed from velocity into pressure, substantially as described.

4. The combination of a water wheel, a revoluble impeller disposed at the discharge of said water wheel, said impeller being fitted with vanes forming passages to receive the water from the water wheel runner, such vanes being disposed so as to give rotary motion to the water flowing through the impeller, means providing an annular passage about said impeller, such annular passage increasing in volume from the impeller wheel outwardly, whereby the energy of the water discharged from the impeller is transformed from velocity into pressure, the pressure maintained at the discharge of the annular passage being greater than that existing at the discharge of the water wheel, substantially as described.

5. In water wheel construction, the combination of a water wheel and a revoluble impeller receiving and driven by discharge water from the water wheel, said impeller being mounted for rotation in the same direction as that of said water wheel and provided with regaining passages disposed about the eye of the impeller.

6. In a water wheel construction, the combination of a water wheel and revoluble impeller receiving and driven by the discharge water from the water wheel, said impeller being mounted for rotation in the same direction as that of said water wheel and provided with passages for discharging the water in a direction opposite to that of the water wheel, said backward discharge setting up within the impeller centrifugal force to reduce the pressure at the discharge point of said water wheel.

7. The combination with a water wheel, of a revoluble impeller disposed centrally at the discharge of said water wheel, said impeller deflecting the water flowing from the water wheel from axial to substantially radial direction of flow, and vanes located in said impeller between which the water is caused to pass, substantially as described.

8. The combination with a water wheel, of a revoluble impeller disposed centrally with relation to the axis of the water wheel, said impeller fitted with vanes forming passages through which the water from said water wheel is caused to flow in a radial direction, substantially as described.

9. The combination with a water wheel, of a revoluble impeller disposed centrally with relation to the axis of said water wheel, said impeller having an impinging surface unobstructed at its eye and fitted with vanes disposed about its eye to form outwardly extending regaining passages through which the water is caused to pass.

10. The combination with a water wheel, of a revoluble impeller disposed centrally with relation to the axis of the water wheel, said impeller fitted with vanes forming outwardly extending passages, said impeller disposed to deflect the direction of flow of the water from axial to outwardly extending and to discharge the water through the outwardly extending passages, substantially as described.

11. The combination with a water wheel, of a revoluble impeller disposed centrally with relation to the axis of the water wheel, said impeller fitted with vanes forming outwardly extending passages, said impeller disposed to deflect in the direction of flow of the water from axial to outward flow in all directions and discharge the water through the outwardly extending passages whereby the energy in the whirling water from the water wheel runner may produce in the impeller centrifugal force for decreasing the pressure at the discharge of the water wheel, substantially as described.

12. In a water wheel construction, the combination of a water wheel and a rotary impeller receiving and driven by the discharge water from the wheel, said impeller being provided with vanes forming passages to receive the water from the water wheel runner and disposed so as to give rotary motion to the water flowing through the impeller.

13. The combination with a water wheel, of a rotary impeller driven by the discharge water from the wheel and operating to increase the head on the water wheel, and means for retarding the speed of the impeller to decrease the head increasing action of said impeller.

14. The combination with a water wheel, of a revoluble impeller fitted with vanes forming passages through which the water from the wheel is discharged, said vanes being backwardly curved adjacent the outlet of the impeller to discharge the water therefrom in a direction opposite to that of the impeller and discharging the water from the impeller at such backward velocity relative to the velocity of the water as it leaves the water wheel as to create centrifugal force in the water passing through the impeller greater than that in the discharge water leaving the wheel and thereby producing a greater pressure in the water discharged from the impeller than that in the discharge water entering it to thereby increase the effective head of water on the wheel.

15. The combination with a water wheel, of a discharge chamber, a rotary impeller disposed in said chamber and driven by the discharge water from the wheel, said chamber having an annular outlet of gradually increasing capacity in the direction of flow disposed adjacent the discharge of said impeller whereby the remaining kinetic energy is transformed into pressure energy to further increase the effective head of water acting on the wheel.

16. The combination of a water wheel and a rotary impeller mounted coaxially thereto and independently thereof to receive and be driven by the water discharging from the water wheel, said impeller having regainer water passages disposed to drive the impeller in the same direction as that of the water wheel.

WILLIAM M. WHITE.

Witnesses:
CHAS. F. MURRAY,
M. A. KIDDIE.